(No Model.)
H. B. ROBISCHUNG.
CHAFING PLATE FOR BRAKE BEAMS.
No. 497,130.  Patented May 9, 1893.
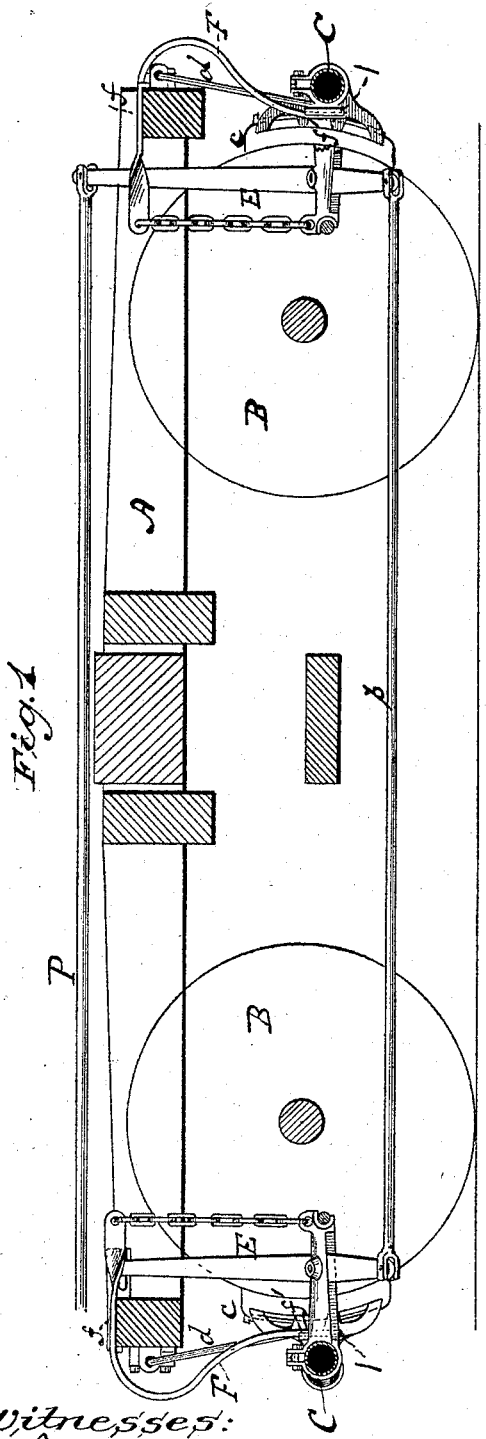
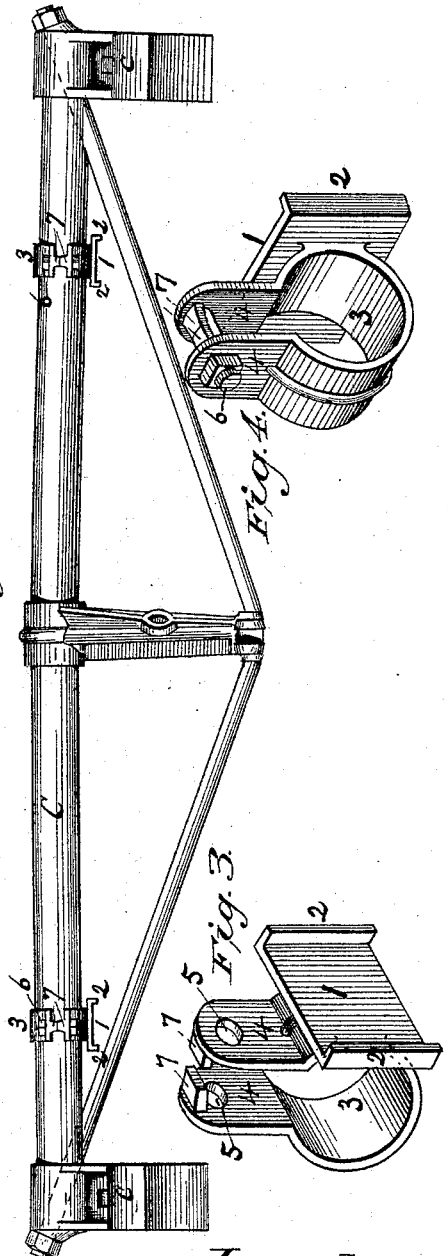
Witnesses:
E. T. Walker
F. R. Cornwall
Inventor.
Henry B. Robischung
by F. W. Ritter
Atty.

UNITED STATES PATENT OFFICE.

HENRY B. ROBISCHUNG, OF KALAMAZOO, MICHIGAN, ASSIGNOR TO THE NATIONAL HOLLOW BRAKE BEAM COMPANY, OF CHICAGO, ILLINOIS.

CHAFING-PLATE FOR BRAKE-BEAMS.

SPECIFICATION forming part of Letters Patent No. 497,130, dated May 9, 1893.

Application filed June 8, 1891. Serial No. 395,426. (No model.)

*To all whom it may concern:*

Be it known that I, HENRY B. ROBISCHUNG, a citizen of the United States, residing at Kalamazoo, in the county of Kalamazoo and State of Michigan, have invented certain new and useful Improvements in Chafing-Plates for Brake-Beams; and I hereby declare the following to be a full, clear, and exact description of the same, reference being had to the accompanying drawings, wherein—

Figure 1 is a sectional view of a truck and its brake beams showing the application of a chafing plate embodying my invention. Fig. 2 is an enlarged plan view of a brake beam having chafing plates embodying my invention applied thereto. Fig. 3 is a detached front perspective view of a chafing plate embodying my invention, and Fig. 4 is a rear perspective view of the same.

Like symbols refer to like parts wherever they occur.

My invention relates to the construction of chafing plates for brake beams especially adapted for use with tubular or hollow beams.

In the construction of brake mechanism there is, as is well understood, combined with the several beams and the system of levers for actuating the same in applying the brakes, a system of springs for taking off the brakes or moving the beams in reverse direction when released by the brake levers, or equivalent mechanism, and said springs bear on the beams so as to cause wear and friction. There are also employed, in addition to the usual beam hangers, a series of safety chains to suspend the beam from the truck and prevent the falling of the beam on the track in case of rupture of the hangers. These chafing plates and safety chains are commonly provided with separate connections with the beam, and such connections are of a general character to require perforation of the structure of the beam, a thing which is inadmissible in the case of hollow metallic beams, and one which results in weakening any structure where it is employed.

The object of my present invention is therefore, twofold, first—the production of a chafing plate having a simple and efficient means by which it can be connected with and adjusted on a brake beam without injury to the structure thereof, and second—to provide a single means of attachment for both chafing plate and safety chain.

To this end my invention generally stated, embraces a chafing plate having a longitudinally slotted clamp sleeve provided with perforated flanges or ears said ears having inwardly projecting limit lugs, whereby a combined plate clamp and safety chain attachment are obtained, all as will hereinafter more fully appear.

I will now proceed to describe my invention more fully, so that others skilled in the art to which it appertains may apply the same.

A indicates a truck of the usual or any approved form, having wheels B B, and provided with hollow brake beams C—in the present instance shown as tubular trussed beams—said beams provided with brake heads *c c*, suspended by hangers *d d*, and provided with the usual or any approved form of brake levers E E, and pull and connecting rods P, *p*, by means of which the brakes are applied.

F F indicate the springs for retracting the beams or forcing them away from the wheels when the power for applying the brakes is withdrawn, and as will be noted said springs—which are usually plate springs—are secured to the truck, as at *f*, and bear upon the beam as at *f'*—two of said springs being used with each beam.

The hereinbefore described devices form no part of the present invention, are only shown to illustrate the application of my improved devices, and therefore may be changed at will.

1 indicates the chafing plate embodying my invention which is a plain surface or table, preferably bounded by flanges 2, 2, to confine the spring and prevent it from slipping off the plate laterally by reason of any lateral or endwise movement of the beam C. Secured to or formed on the back of said chafing plate 1 is a clip 3, preferably in the form of a longitudinally slotted or open sleeve having parallel projecting flanges or ears 4, 4, perforated as at 5, 5, for the passage of a suitable bolt 6 by which the clip is caused to bind upon the beam C. In order to prevent the flanges or ears 4, 4, from coming too closely together, and to allow room for the passage of a link of the safety chain so that the same clip or fastening may be made use of for securing to the beam the end of the safety chain as well as the chafing plate, I form lugs or projections 7, 7, upon the inner or adjacent surfaces of the ears 4, 4, which lugs limit the inward movement of the ears 4, 4, but do not interfere with the necessary contraction of the circular clip 3 by the bolt 6.

It will be observed that owing to the formation of the clip fastenings of the chafing plates—the plates can be adjusted on or moved to any part of the beam that the position of the springs F F may require, and can be attached securely to the beam without injuring the structure thereof, and that further, efficient fastenings for the safety chains are also secured.

Having thus described my invention, what I claim, and desire to secure by Letters Patent, is—

1. A chafing plate provided with an open tube clip said clip having projecting perforated ears provided with lugs on their adjacent faces; substantially as and for the purposes specified.

2. The combination with chafing plate 1, of the slotted tubular clip 3 having parallel perforated flanges 4, 4 provided with lugs 7, 7, substantially as and for the purposes specified.

In testimony whereof I affix my signature, in presence of two witnesses, this 6th day of June, 1891.

HENRY B. ROBISCHUNG.

Witnesses:
E. B. LEIGH,
E. T. WALKER.